United States Patent
Nakagawa et al.

(10) Patent No.: US 7,268,506 B2
(45) Date of Patent: Sep. 11, 2007

(54) POWER WINDOW SYSTEM

(75) Inventors: Satoshi Nakagawa, Aichi (JP);
Yoshimitsu Maejima, Shizuoka (JP);
Yasuyuki Mochizuki, Shizuoka (JP);
Katsuyuki Iwasaki, Shizuoka (JP);
Susumu Yamamoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/144,618

(22) Filed: Jun. 6, 2005

(65) Prior Publication Data

US 2006/0038519 A1     Feb. 23, 2006

(30) Foreign Application Priority Data

Aug. 17, 2004  (JP) .............................. 2004-237005

(51) Int. Cl.
  *H02P 3/00*   (2006.01)
  *H02P 5/00*   (2006.01)
  *H02P 7/00*   (2006.01)

(52) U.S. Cl. .................... 318/280; 318/281; 318/282; 318/283; 318/284; 318/285; 318/286; 318/461; 318/469

(58) Field of Classification Search ........ 318/280–286, 318/461–469, 138, 254, 439
See application file for complete search history.

(56) References Cited

U.S. PATENT DOCUMENTS

| | | | | |
|---|---|---|---|---|
| 5,952,801 A * | 9/1999 | Boisvert et al. | ............ | 318/468 |
| 6,031,348 A * | 2/2000 | Fehr et al. | ............ | 318/283 |
| 6,426,604 B1 * | 7/2002 | Ito et al. | ............ | 318/466 |
| 6,548,979 B2 * | 4/2003 | Boisvert et al. | ............ | 318/469 |
| 6,580,241 B1 * | 6/2003 | Sugawara | ............ | 318/443 |
| 6,667,590 B2 * | 12/2003 | Nagaoka | ............ | 318/286 |
| 6,794,837 B1 * | 9/2004 | Whinnery et al. | ............ | 318/282 |
| 6,936,984 B2 * | 8/2005 | Wilson | ............ | 318/280 |
| 2003/0085679 A1 * | 5/2003 | Bledin et al. | ............ | 318/264 |
| 2004/0043802 A1 * | 3/2004 | Nagano | ............ | 455/575.9 |
| 2004/0183493 A1 * | 9/2004 | Boisvert et al. | ............ | 318/469 |
| 2004/0236479 A1 * | 11/2004 | Hattori | ............ | 701/2 |
| 2005/0174077 A1 * | 8/2005 | Haag et al. | ............ | 318/280 |

FOREIGN PATENT DOCUMENTS

| | | |
|---|---|---|
| JP | 10-250375 | 9/1998 |
| JP | 2001-98842 | 4/2001 |

* cited by examiner

*Primary Examiner*—Lincoln Donovan
*Assistant Examiner*—Tyrone Smith
(74) *Attorney, Agent, or Firm*—Kratz, Quintos & Hanson, LLP

(57) ABSTRACT

The power window system moves a window glass in opening and closing directions in response to operation of an opening and closing instruction switch. The power window system includes a measurement device for obtaining an open degree of the window glass and a control device for controlling movement of the window glass in response to operation of the switch. The control device moves the window glass in the closing direction when an open degree obtained by the measurement device is not less than a predetermined degree and in the opening direction when the open degree is less than the predetermined degree.

5 Claims, 4 Drawing Sheets

POWER WINDOW SYSTEM

BACKGROUND OF THE INVENTION

1. Field of the Invention

The present invention relates to a power window system, more particular to a power window system that moves a window glass in opening and closing directions in response to operation of a single switch.

2. Related Art

Recently, a power window system has been proposed, in which a remote control single switch operates a window glass to move in opening and closing directions. For example, this type power window system opens and closes a side window glass of a motor vehicle. The power window system has a remote control unit to input instructions for opening and closing the window glass and an in-vehicle-mounted unit for moving the window glass in response to the instructions of the remote control unit.

FIG. 4 is a flowchart showing process steps of the in-vehicle unit with regard to the power window system. Step S91 of FIG. 4 determines whether a power window (PW) operation signal has been input. When the determination is affirmative, the execution of the system goes to step S92. The PW operation signal is specified in an "up" movement for moving the window glass upward, a "down" movement for moving the window glass downward, or another order for moving the window glass.

Step S92 determines whether the PW operation signal is specified in one of the up and down movements. When the PW operation signal is specified in one of the movements, the execution goes to step S94. Meanwhile, when the PW operation signal is the other order, the execution goes to step S93.

Step S94 determines whether the PW operation signal is specified in an up movement or a down movement. When the PW operation signal is specified in an up movement, the execution goes to step S96 for moving the window glass upward. Meanwhile, when the PW operation signal is specified in a down movement, the execution goes to step S95 for moving the window glass downward.

When the decision of S92 is negative, the execution goes to step S93 that determines whether the window glass is fully closed or not. When the decision is affirmative, the execution goes to step S95 for outputting a down instruction to move the window glass downward. Meanwhile, when the decision is negative, the execution goes to step S96 for outputting an up instruction to move the window glass upward.

A prior art related to the present invention is disclosed in Japanese Patent Application Laid-open No. H-10-250375 or in Japanese Patent Application Laid-open No. 2001-98842.

As disclosed in a prior art disclosed in the latter patent application, some conventional power window systems have a device for preventing pinching of an intervening object during an upward movement of a window glass. The device detects an over current flowing in an electric motor moving the window glass and turns the motor adversely to move the window glass downward. A masking process may have been applied to prevent a wrong reverse turn of the motor due to an over current during a starting period of the motor. Thus, the over current tends to be set at a comparative higher value.

To prevent the wrong reverse turn of the motor, the masking process is applied in a circuit related to the flowchart of FIG. 4. When the window glass is not positioned in a fully closed state, the window glass moves upward in response to a closing signal of an opening and closing instruction switch. Therefore, during the start masking process, the motor does not turn adversely for a short while even when the window glass pinches a finger, a hand, or an arm of a passenger. Accordingly, the conventional power window system employing the single switch must be still improved.

SUMMARY OF THE INVENTION

In view of the aforementioned situation, an object of the invention is to provide a practical power window system that can surely prevent pinching of a finger, a hand, or an arm of a passenger. The power window system has a single switch with a simple operability.

For achieving the object, a first aspect of the present invention, which is shown in FIG. 1, is a power window system for moving a window glass W in opening and closing directions in response to operation of an opening/closing instruction switch 13A. The system includes:

a measurement device 25A for obtaining an open degree of the window glass W, and a control device 21A for controlling movement of the window glass W in response to operation of the instruction switch, wherein the control device 21A moves the window glass W in the closing direction when an open degree obtained by the measurement device is not less than a predetermined degree and in the opening direction when the open degree is less than the predetermined degree. Thus, when the window glass W is stopping with an open degree less than the predetermined degree, the window glass W moves in the opening direction. This keeps a simple operability of the opening/closing instruction switch 13A and makes the power window system practical.

The predetermined open degree corresponds to an intermediate position between a closed position and a fully open position with regard to the window glass, as shown in FIG. 1. In other words, the window glass W moves not in the closing direction but in the opening direction, when the open degree is less than that of the intermediate position. This can surely prevent pinching of a finger, a hand, or an arm of a passenger.

Preferably, as shown in FIG. 1, the power window system further includes:

a remote control unit 1 having the opening/closing instruction switch 13A and a transmission device 12A for transmitting a radio signal corresponding to the operation of the opening/closing instruction switch 13A, and a driving unit 2A having the measurement device 25A, the control device 21A, and a receiver device 22A for receiving the radio signal. Thus, the remote control unit 1 transmits a radio control signal corresponding to operation of the switch 13A.

Preferably, as shown in FIG. 1, the switch 13A is a single switch having an operation portion movable only in one direction. Thus, the remote control unit 1 is improved in compactness and can be integrated with a car key remotely operated.

Preferably, the power window system has an electric motor for moving the window glass, and the predetermined open degree corresponds to a value obtained by adding an initial movement amount of the window glass with a diameter of an intervening object, the initial movement amount corresponding to a period in which an over current is generated in the motor at starting of the motor. The intervening object is a finger, a hand, or an arm of a person.

DETAILED DESCRIPTION OF PREFERRED EMBODIMENT

Figure 1:
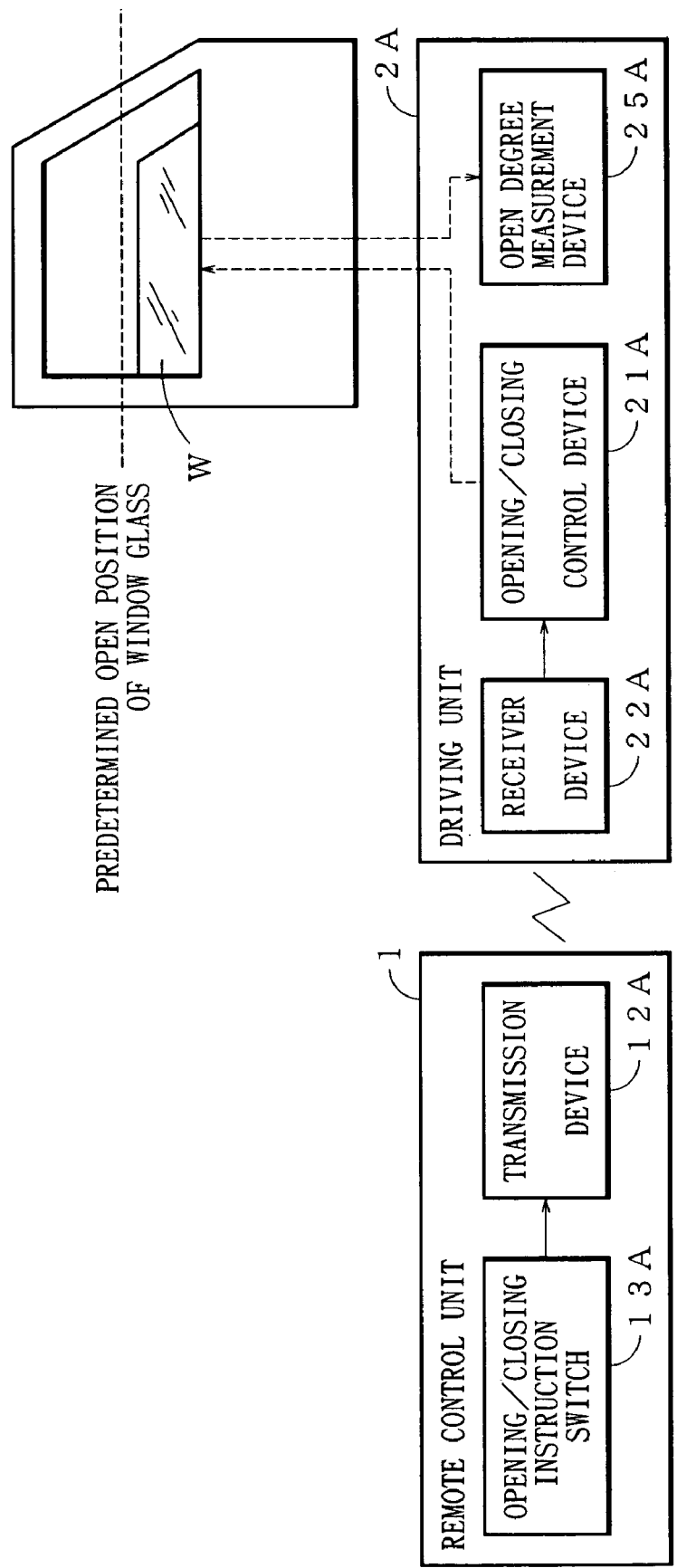
FIG. 1 is a block diagram showing a basic configuration of a power window system according to the present invention.
Figure 2:
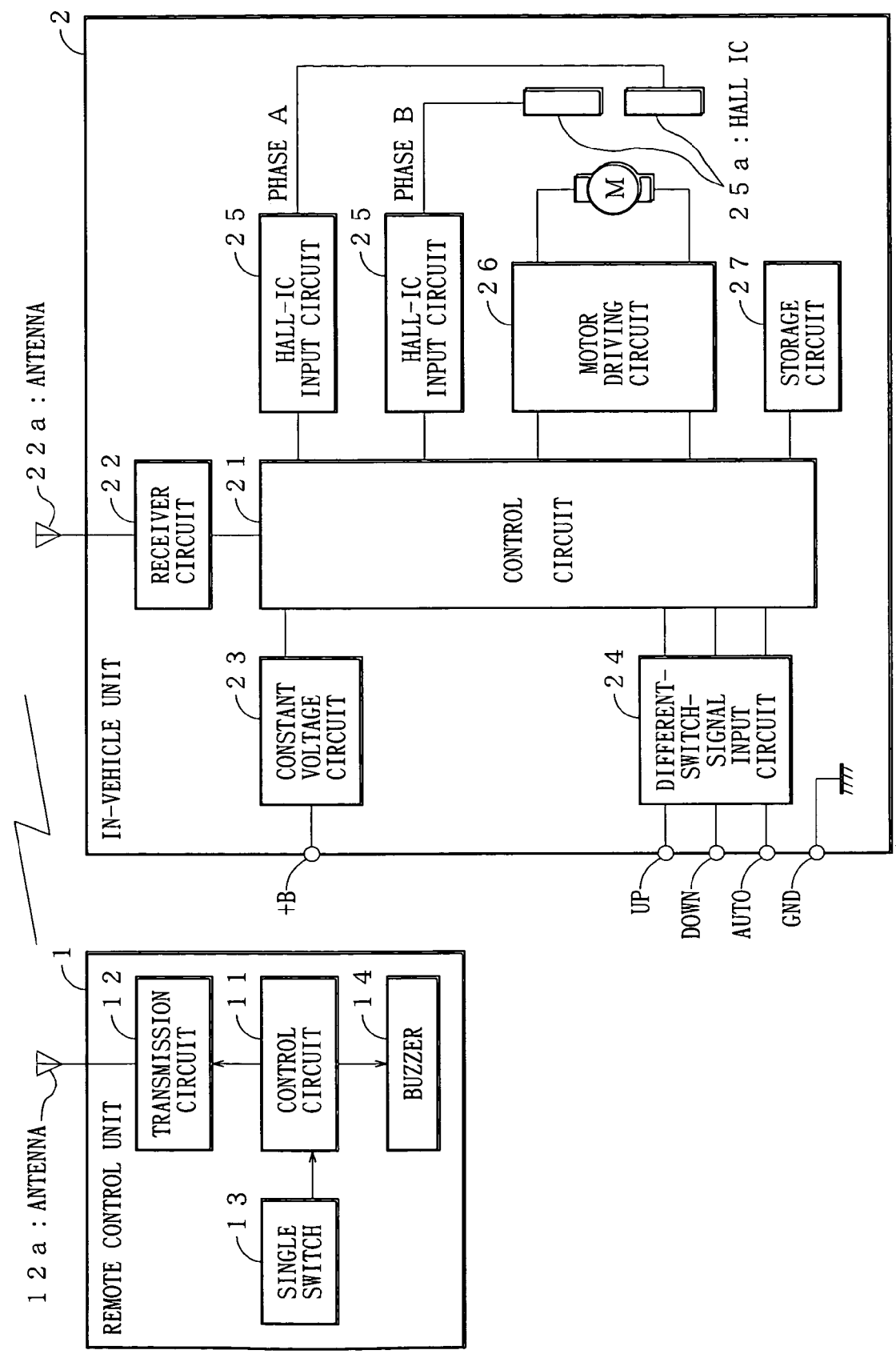
FIG. 2 is a block diagram showing a configuration of a power window system according to an embodiment of the present invention.

Referring to the accompanied drawings, embodiments of the present invention will be discussed hereinafter. FIG. 2 is a block diagram showing a hardware configuration of a power window system of an embodiment according to the present invention.

The power window system, for example, operates to open and close a side window glass of a motor vehicle. As shown in FIG. 2, the power window system has a remote control unit 1 and an in-vehicle unit 2. In this discussion, "up" means a closing movement of the window glass and "down" means an opening movement of the window glass.

As shown in FIG. 2, the remote control unit 1 has a control circuit 11, a transmission circuit 12 corresponding to a radio device of claims, a single switch 13 corresponding to an opening/closing instruction switch of the claims, and a buzzer 14. The remote control unit 1 may have a profile like a remote unit including a car key for a well-known remote entry device. The control circuit 11 is a micro computer having a CPU (central processing unit), a ROM (read only memory), and a RAM (random access memory). The transmission circuit 12 transmits a radio control signal to the in-vehicle unit 2 via an antenna 12a. The control signal is provided from the control circuit 11 in response to operation of the single switch 13.

The single switch 13 is pushed along a line like a remote control switch provided in a remote key entry system. The single switch 13 may operate to slide along the line. The buzzer 14 is optionally provided to give a confirmation signal when the single switch 13 transmits a control signal.

The in-vehicle unit 2 (driving unit in claims), as shown in FIG. 2, has a control circuit 21 (control device in the claims), a receiver circuit 22 (radio device) in the claims), a constant voltage circuit 23, a different-switch-signal input circuit 24, Hall-IC input circuits 25, Hall ICs 25a (measurement device in the claims), a motor M, a motor driving circuit 26, and a storage circuit 27. The in-vehicle unit 2 serves for processing of an embodiment described later of the present invention to control opening/closing of a window glass. The receiver circuit 22 receives a radio control signal transmitted from the transmission circuit 12 of the remote control unit 1 via an antenna 22a to provide it to the control circuit 21. The constant voltage circuit 23 converts a voltage applied to a terminal +B by an in-vehicle mounted battery (not shown) to a constant predetermined voltage, distributing it to a plurality of sections including the control circuit 21 within the in-vehicle unit 2.

The different-switch-signal input circuit 24 is connected to a plurality of different switches (not shown) located in the side of the driving unit for upward, downward, and automatic movements of the window glass via terminals. Then, signals from the different switches are received in the control circuit 21. The control circuit 21 controls the motor M to move the window glass upward and downward in response to the signals provided from the different switches.

The motor M is a DC motor having a commutator for rotating normally and adversely to open and close a window glass. The motor M is electrically connected to the control circuit 21 via the motor driving circuit 26. The control circuit 21 also connects with a pair of the Hall ICs 25a via a pair of the Hall-IC input circuits 25. The Hall ICs 25a each generate each pulse signal having one of phases A and B that are 90° offset from each other. The Hall-IC input circuits 25 provide the pulse signals to the control circuit 21. Based on the pulse signals, the control circuit 21 calculates a present open degree of the window glass and determines the turning direction of the motor M, that is, the moving direction of the window glass. These data are stored in the storage circuit 27. Such a calculation process to obtain an open degree of a window glass is disclosed in the prior art disclosed in the aforementioned latter patent application.

The storage circuit 27, for example, is constituted by an EEPROM (Electrically Erasable and Programmable ROM) and stores a present open degree and a predetermined open degree of the window glass. Preferably, the predetermined open degree is set to a value corresponding to an appropriate intermediate potion between fully closed and fully open positions of the window glass. Because, a finger or an arm of a person or passenger tends to be pinched by the window glass when an open degree of the window glass at a stopping position is narrower than the appropriate intermediate position. The predetermined open degree may be set in view of a diameter of a finger, a hand, or an arm with a movement distance of the window glass during the masking process at the start of the motor M.

Figure 3:
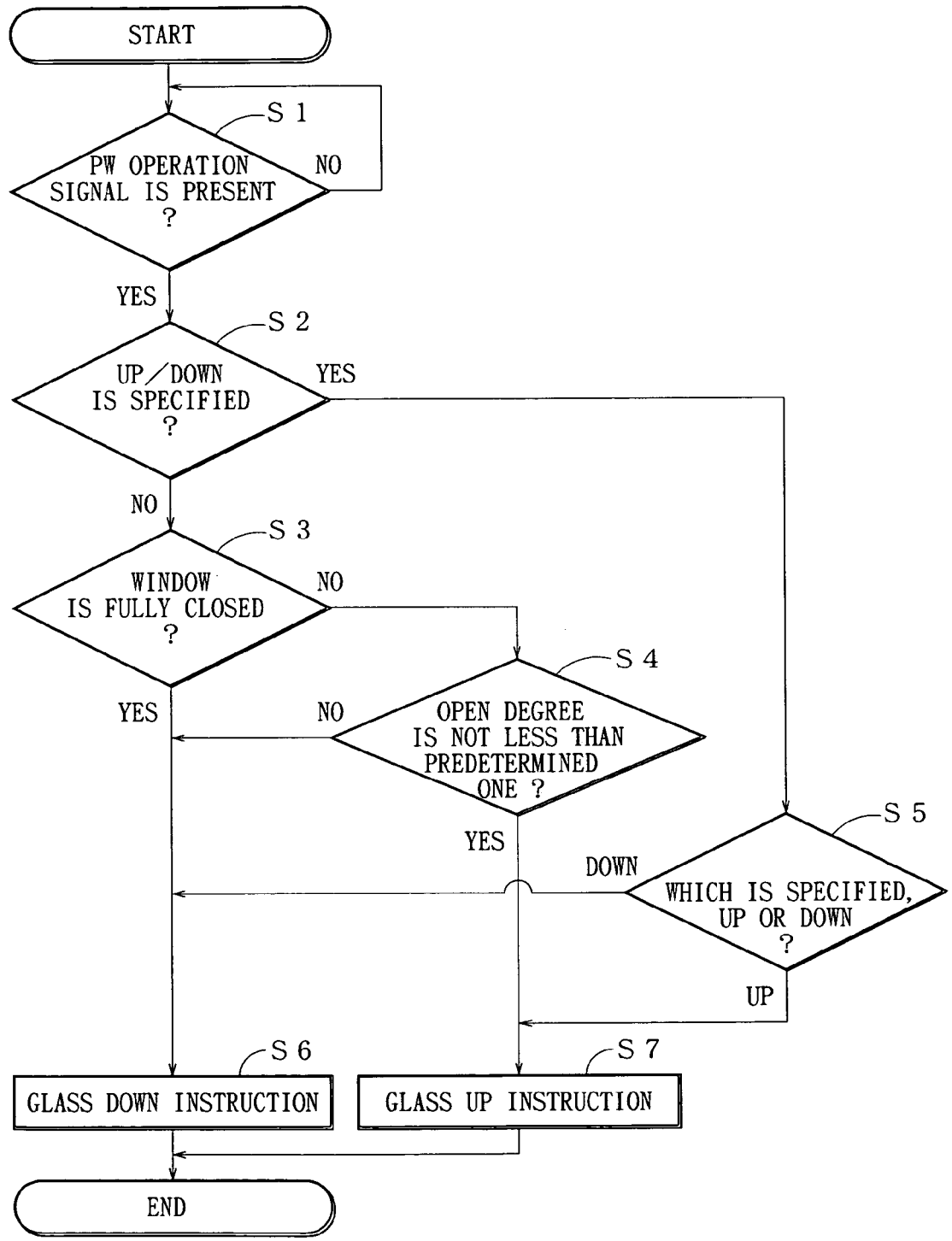
FIG. 3 is a flowchart showing processing steps according to an embodiment of the present invention.
Figure 4:
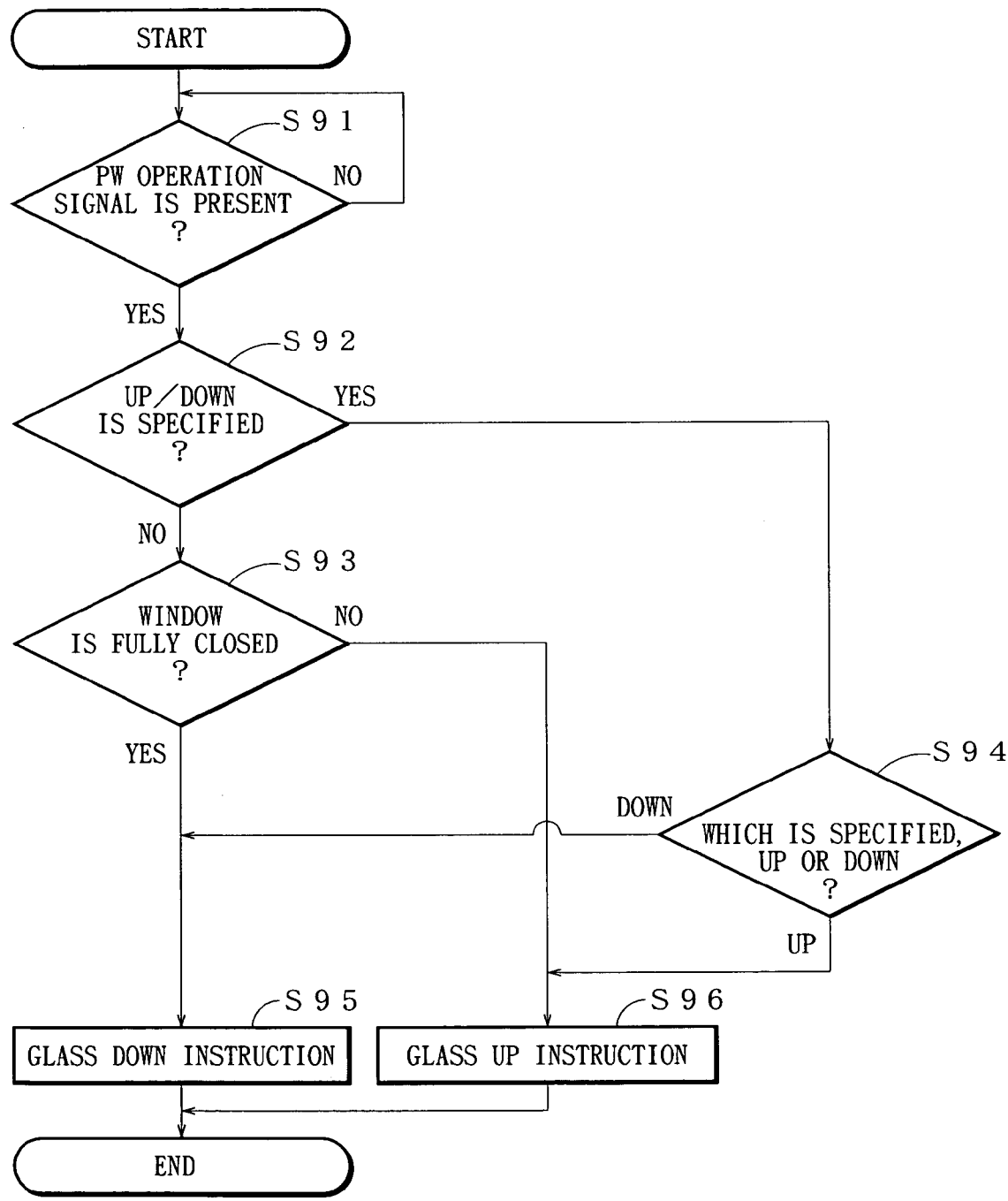
FIG. 4 is a flowchart showing processing steps of a prior-art power window system.

Next, processing steps of a power window system according to an embodiment of the present invention will be discussed. FIG. 3 is a flowchart showing processing steps of the embodiment. The control circuit 21 performs the processing steps of the flowchart.

Step S1 of FIG. 3 determines whether a power window (PW) operation signal has been input. When the determination is affirmative, the execution of the system goes to step S2. The PW operation signal shows an up movement for moving the window glass upward, a down movement for moving the window glass downward, or another order for moving the window glass in respect of the single switch 13.

Step S2 determines whether the PW operation signal is specified in one of an up movement and a down movement. When the PW operation signal is specified in one of the up and down movements, the execution goes to step S5. Meanwhile, when the PW operation signal is the other order for moving the window glass, the execution goes to step S3.

Step S5 determines whether the PW operation signal is specified in an up movement or a down movement. When the PW operation signal is specified in a down movement, the execution goes to step S6 to provide a down instruction. Meanwhile, when the PW operation signal is specified in an up movement, the execution goes to step S7 to provide an up instruction. The motor driving circuit 26 rotates the motor M normally for moving the window glass downward in response to the down instruction and adversely for moving the window glass upward in response to the up instruction.

When the decision of step S3 is negative, the execution goes to step S4. In step S4, both the predetermined open degree and a present open degree of the window glass are read out from the storage circuit 27, and the two open degrees are compared with each other. When the present open degree is less than the predetermined degree (NO at step S4), the execution goes to step 6 to provide a glass down instruction. Meanwhile, when the present open degree is not less than the predetermined degree (YES at step S4), the execution goes to step 7 to provide a glass up instruction. Then, the motor driving circuit 26 rotates the motor M normally for moving the window glass downward in response to the down instruction and adversely for moving the window glass upward in response to the up instruction.

Preferably, operations of the different switches have priories over that of the single switch 13 when both the switches are operated simultaneously.

The embodiments described above can provide practical power window systems that can surely prevent pinching of a finger, a hand, or an arm of a passenger. The power window system has the single switch 13 with a simple operability.

A power window system according to the present invention is effectively employed in a motor vehicle and also applied to control opening and closing operation of a window glass of a building. The opening/closing instruction switch is advantageously integrated in a remote control unit having a car key but may be separately positioned in another desirable specified location. The single switch may serve to operate a window glass positioned near a driver seat or at another specified position. The single switch may function to operate a plurality of window glasses simultaneously.

What is claimed is:

1. A power window system of a motor vehicle for preventing pinching of an intervening object when moving a window glass in a closing direction, the system moving the window glass in opening and closing directions in response to operation of an opening and closing instruction switch to move the window glass upward or downward, the system comprising:

a measurement device for obtaining an open degree of the window glass prior to moving the window glass upward or downward, and a control device for controlling movement of the window glass in response to operation of the switch, the switch having three instruction modes of up, down, and auto operations of the window glass, wherein, in the mode of auto operation of the switch, the control device, after having determined that the window glass is not fully closed, uses solely an open degree obtained by said measurement device prior to moving the glass upward or downward compared to a predetermined degree, and moves the window glass in the closing direction when the open degree is not less than the predetermined degree and moves the window glass in the opening direction when the open degree is less than the predetermined degree, and the predetermined degree corresponds to an intermediate position between a closed position and a fully open position with regard to the window glass.

2. The power window system recited in claim 1, further comprising:

a remote control unit having the switch and a radio device for transmitting a radio signal corresponding to the operation of the switch, and a driving unit having the measurement device, the control device, and a receiver device for receiving the radio signal.

3. The power window system recited in claim 2, wherein the switch is a single switch having an operation portion movable only in one direction.

4. The power window system recited in claim 1, further comprising an electric motor for moving the window glass, wherein the predetermined open degree corresponds to a value obtained by adding an initial movement amount of the window glass to a diameter of an intervening object, the initial movement amount corresponding to an amount moved by the window glass during a period in which an over current is generated in the electric motor at starting of the electric motor.

5. The power window system recited in claim 4, wherein the intervening object is a finger, a hand or an arm of a person.

* * * * *